(12) United States Patent
Mosier et al.

(10) Patent No.: US 6,675,660 B1
(45) Date of Patent: Jan. 13, 2004

(54) COMPOSITION PULSE TIME-OF-FLIGHT MASS FLOW SENSOR

(75) Inventors: Bruce P. Mosier, San Francisco, CA (US); Robert W. Crocker, Fremont, CA (US); Cindy K. Harnett, Livermore, CA (US)

(73) Assignee: Sandia National Laboratories, Livermore, GA (US)

( * ) Notice: Subject to any disclaimer, the term of this patent is extended or adjusted under 35 U.S.C. 154(b) by 0 days.

(21) Appl. No.: 10/210,647

(22) Filed: Jul. 31, 2002

(51) Int. Cl.[7] ................................................. G01P 5/18
(52) U.S. Cl. .................................................. 73/861.07
(58) Field of Search .......................... 73/861.07, 202.5, 73/204.27, 23.35; 204/602, 452; 422/70; 436/183; 250/281, 283

(56) References Cited

U.S. PATENT DOCUMENTS

| | | | | |
|---|---|---|---|---|
| 3,996,795 A | * | 12/1976 | Servassier | 73/861.09 |
| 5,031,449 A | * | 7/1991 | Kuwana et al. | 73/1.58 |
| 5,496,998 A | * | 3/1996 | Bergmann | 250/287 |
| 5,998,215 A | * | 12/1999 | Prather et al. | 436/173 |
| 6,221,226 B1 | * | 4/2001 | Kopf-Sill | 204/602 |
| 6,354,150 B1 | * | 3/2002 | Rudent et al. | 73/202.5 |

OTHER PUBLICATIONS

Wu, J.; Sansen, W.; "Electrochemical time of flight flow sensor"; *Sensors and Actuators* (A) Elsevier Science B.V., v(97) Apr. 1, 2002; pp. 68–74.

\* cited by examiner

*Primary Examiner*—Edward Lefkowitz
*Assistant Examiner*—Jewel V. Thompson
(74) *Attorney, Agent, or Firm*—Donald A. Nissen

(57) ABSTRACT

A device for measuring fluid flow rates over a wide range of flow rates (<1 nL/min to >10 $\mu$L/min) and at pressures at least as great as 10,000 psi. The invention is particularly adapted for use in microfluidic systems. The device operates by producing compositional variations in the fluid, or pulses, that are subsequently detected downstream from the point of creation to derive a flow rate. Each pulse, comprising a small fluid volume, whose composition is different from the mean composition of the fluid, can be created by electrochemical means, such as by electrolysis of a solvent, electrolysis of a dissolved species, or electrodialysis of a dissolved ionic species. Measurements of the conductivity of the fluid can be used to detect the arrival time of the pulses, from which the fluid flow rate can be determined

17 Claims, 3 Drawing Sheets

COMPOSITION PULSE TIME-OF-FLIGHT MASS FLOW SENSOR

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS-REFERENCE TO RELATED APPLICATIONS

Not applicable.

FIELD OF THE INVENTION

The present invention relates generally to a device, capable of operating at high pressure, for the detection of fluid flow rates over a wide range of flow rates (<1 nL/min to >10 µL/min) and particularly for measuring fluid flow rates in microfluidic devices.

BACKGROUND OF THE INVENTION

Numerous types of mass flow meters are generally available. Some are based on viscous drag, others employ the Venturi effect to measure a pressure drop, still others use positive displacement either rotary or linear. For low flow rates, local heating of a passing fluid and a variation in the resistance of a resistive element or the current/voltage required to maintain a constant temperature/current in the resistive element is conventionally used to determine fluid flow rate, wherein the fluid can be either a liquid or a gas. Rudent et al. in U.S. Pat. No. 6,354,150 "Sensor for a Capillary Tube of a Mass Flow Meter", issued Mar. 12, 2002, describe a mass flow rate sensor based on the time-of-flight of a thermal pulse. The time-of-flight of a small volume of liquid is measured from an upstream position where the temperature is modified to a downstream detector. However, the thermal sensor requires specially insulated components to avoid thermal transients, which can be a disadvantage.

SUMMARY OF THE INVENTION

The invention is directed, in part, to a device and method for measuring very small fluid flow rates (nL/min range), and particularly for measuring flow rates in microfluidic devices. The invention operates by producing localized compositional variations in the fluid at two distinct locations along the flow axis. The compositional variation, or pulse, that is subsequently detected downstream from its point of creation is used to derive a flow rate. The pulse, comprising a narrow zone in the fluid whose composition is different from the mean composition of the fluid, can be created by electrochemical means, such as by electrolysis of a solvent, electrolysis of a dissolved species, or electrodialysis of a dissolved ionic species.

In contrast to prior art thermal flow sensors, the present invention is thermally robust in that no insulation is required to avoid thermal transients and it retains superior sensitivity as it is scaled down to the nanoliter regime and sub-millimeter dimension. Decreasing the scale of thermal flow sensors increases the heat transfer rate from the heated fluid volume to the surroundings due to a high surface-to-volume ratio and small length scale. This results in poor signal-to-noise at small flow rates (≈nL/min). In contrast, a composition pulse, such as produced here, retains its signal-to-noise ratio because mass diffusion is confined to the fluid and mass diffusivity is much smaller than thermal diffusivity. Moreover, this device is capable of operating at pressures as great as 10,000 psi, limited only by the strength of the materials of construction.

In one embodiment, the invention is directed to a device for detecting the mass flow rate of a fluid that includes:

spaced-apart electrodes disposed along the flow axis in a fluid flow channel;

means for supplying a voltage to the electrodes to produce a local compositional variation in a fluid;

means for detecting the compositional variation; and means for determining time-of-flight of the variation.

In a second embodiment, the invention is directed to a device for detecting mass flow rate of a fluid in a capillary channel or microfluidic device that includes:

spaced-apart electrodes disposed along the flow axis in a fluid flow channel;

means for supplying a voltage to the electrodes to produce a local compositional variation in a fluid;

means for detecting the compositional variation; and means for determining time-of-flight of the variation.

As used hereinafter, the term "fluid" is understood to mean a liquid that can or cannot be a solution.

BRIEF DESCRIPTION OF THE DRAWINGS

The accompanying drawings, which are incorporated in and form part of the specification, illustrate the present invention and, together with the description, explain the invention. In the drawings, like elements with like functions are referred to by like numbers.

DETAILED DESCRIPTION OF THE INVENTION

Figure 1:
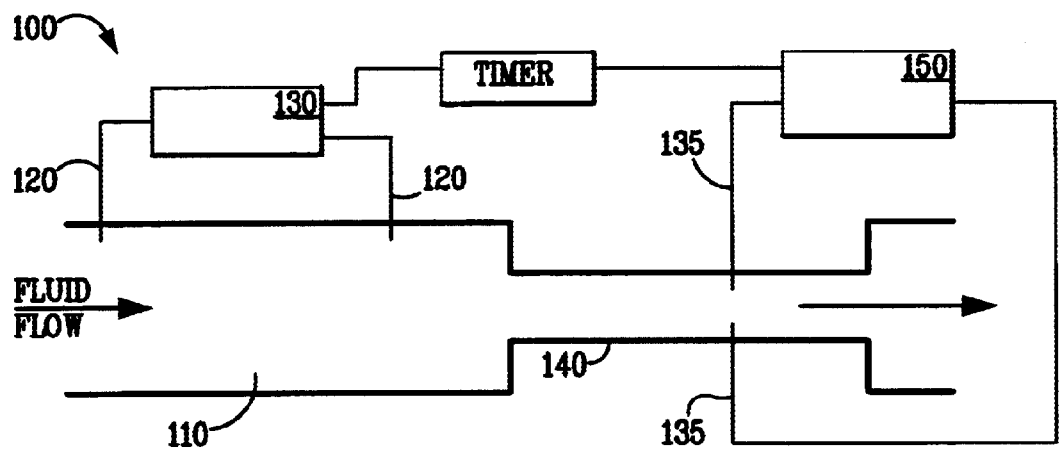
FIG. 1 shows a schematic embodiment of the invention.

The invention and its operation are illustrated schematically in FIG. 1. The flow sensor 100 comprises a flow channel 110 having a single fluid entrance and a single exit where fluid flow is from left to right. A pair of spaced-apart electrodes 120 for producing an electrochemical pulse, or pair of pulses, one on each electrode, and consequent variation in composition of the fluid, including changes in the concentration of some component in the fluid, is disposed within the flow channel and along the flow axis. Means for supplying a voltage pulse to the electrodes, such as power supply 130, is connected to the electrodes. A flight tube 140 that is concentric with flow channel 110 can be adjoined to the fluid exit of the flow channel. As will be appreciated by those skilled in the art, the dimensions of the flight tube can be selected for a particular flow rate range, fluid viscosity, and ion diffusivity to govern mass transport and hence, the response time and sensitivity of detection of the pulse produced by the upstream electrodes. The flight tube is preferably smaller in diameter than the flow channel in order to achieve a high Reynolds number for rapid transport of the ions to the bulk flow. By way of example, for a flow channel is 100 µm in diameter, the flight tube is preferably ≈5–15 µm in diameter. For a 3 µm wide flow channel a flight tube diameter of about 10–50 nm is preferred. Sensor 150 is designed to detect the pulse in the fluid produced by electrodes 120 and generally comprises a pair of wire electrodes 135, preferably stainless steel wires or more preferably platinum, palladium, or gold wires, opposite each other and disposed within the flight tube or proximate its exit. Generally, sensor 150 can be a conductivity sensor that detects changes in conductivity of the fluid caused by changes in the composition of the fluid. Flow rate of the fluid is measured by determining the flight time, the time difference between the creation of the electrochemical pulse and the arrival of the pulse at the sensor.

The composition variation needed to determine fluid flow rate can be produced in different ways, examples are given below.

An electrochemical pulse can be generated by electrolysis of the fluid itself. One of the pair of spaced-apart electrodes acts as an anode and at that electrode one or more species can be oxidized. The operation of the flow sensor in this mode can be exemplified by water as the fluid. Electrolytic oxidation of water under neutral or acidic conditions produces oxygen gas, a portion of which remains dissolved in the water, and hydrogen ions. Consequently, the fluid adjacent the anode becomes more conductive. At the second of the pair of electrodes, the cathode, hydrogen ions are reduced to neutral hydrogen, thereby depleting the region around the cathode of ions and reducing its conductivity. Under basic conditions, the opposite is true. Thus, two pulses or regions of compositional variation are created at the electrodes and their presence can be detected downstream by measuring changes in conductivity of the fluid.

An electrochemical pulse useful for measuring fluid flow rate can also be produced by electrolysis of dissolved species, such as a redox couple. As before, local composition variations, i.e., pulses, will be formed by electrochemical oxidation or reduction of the redox couple at each electrode, thereby producing a region of increased or decreased conductivity.

Figure 2:
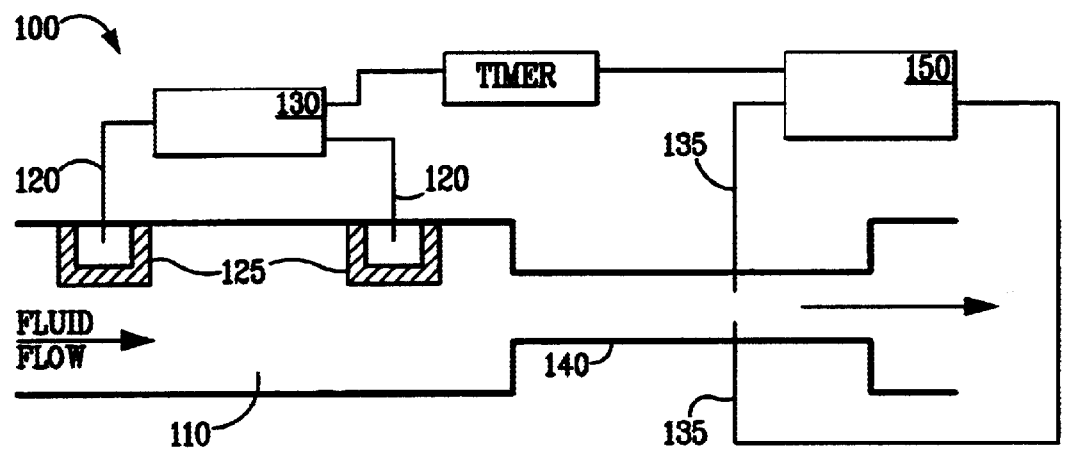
FIG. 2 shows a second embodiment.

Electrodialysis is another method of producing an electrochemical pulse in a flowing fluid. The advantage of electrodialysis is that there is no direct electrolysis of any species in the fluid flow path, thereby avoiding creating undesirable byproducts in the fluid such as oxidizing or reducing species that could interfere with downstream processes. More importantly, the use of electrodialysis avoids the formation of electrolytic gas bubbles that could change the fluid flow regime and interfere with analytical instrumentation. An embodiment of the invention, wherein an electrochemical pulse is produced by electrodialysis is shown in FIG. 2. Here, the pulse electrodes 120 are separated from the fluid by outer body 125 that is a material or membrane that provides for diffusion of water into electrode 120 but not diffusion out of gas bubbles. The outer body or membrane can be made from ultra micro-porous, or nano-porous, glass or an ionomer material. A preferred material for outer body 125 is Nafion™, a cation-selective perfluorosulfonate ionomer, that provides for diffusion of water to electrode 120.

In application, a brief (<1 sec in duration) large (>1 kV) DC voltage pulse is applied between electrodes 120. Electrolysis at the electrode/Nafion™ interface, cation transport within the region between body 125 and electrode 120, and electrolytic transport within the fluid result in a region of enhanced ion concentration at the anode Nafion™/fluid interface and a region of reduced ion concentration at the cathode Nafion™/fluid interface. The localized enhancement and depletion regions (pulses) are advected downstream by the flow to sensor 150.

The examples above are intended to be illustrative of the application of the present invention and are not to be construed as a limitation or restriction thereon, the invention being delineated in the claims.

While the invention has been described and illustrated by means of a capillary tubes or microchannels, it is understood that the capillary tubes and/or microchannels themselves can be part of a microfluidic device or system. The microfluidic device or system can be comprised of channels, reservoirs, and arbitrarily shaped cavities that are fabricated using any of a number of art recognized microfabrication methods, including injection molding, hot embossing, wet or dry etching, or deposition over a sacrificial layer. The microfluidic device can also include holes and/or ports and/or connectors to adapt the microfluidic channels and reservoirs to external fluid handling devices. The term "microfluidic" refers to a system or device having channels or chambers that are generally fabricated on the micron or submicron scale, e.g., having at least one cross-sectional dimension in the range from about 0.1 µm to about 500 µm, i.e., microchannels.

Figure 3:
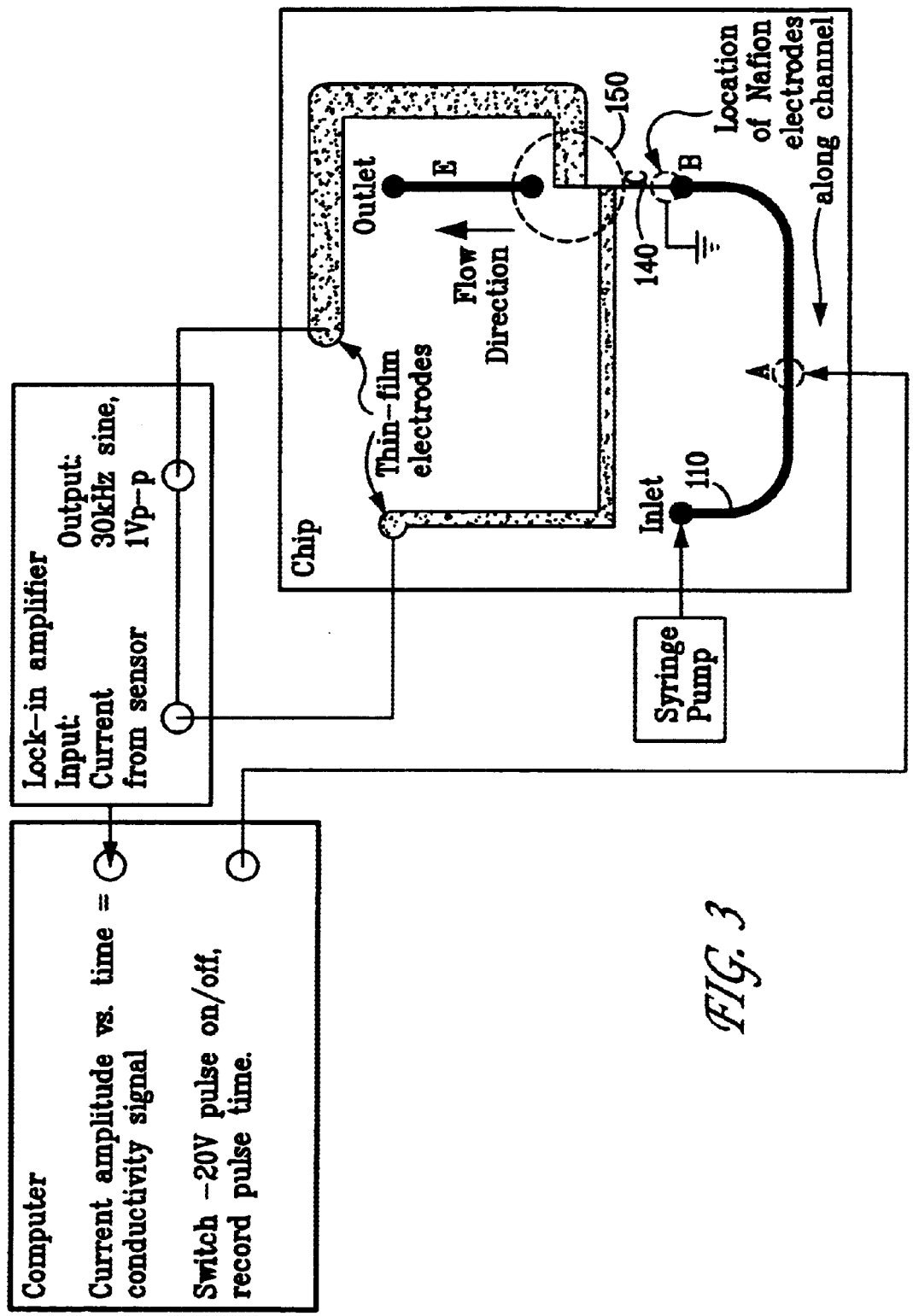
FIG. 3 is a microfluidic chip having an incorporated time-of-flight flow rate sensor.

The time-of-flight fluid flow rate sensor described above can be fabricated as part of a microfluidic device such as that shown generally in FIG. 3.

Fluid was pumped through flow channel 110 (50 µm deep, 100 µm wide and about 1 cm long) by pumping means, such as a syringe pump, and flowed between electrodes 120 located generally at points A and B along the flow channel. While the electrodes can be bare wires, such as described above, it is desirable in microfluidic applications to use ionomer-based electrodes, and particularly Nafion™-based electrodes, to eliminate the formation of gas bubbles that can block fluid flow through the narrow microchannels or form high impedance obstructions to uniform fluid flow. The Nafion™-based electrodes used herein were fabricated by injecting a Nafion solution (supplied by Dupont as a 5–20% Nafion solution in alcohol and water) into a fritted glass capillary. The Nafion solution was forced through the pores of the frit using gas pressure and dried to form a 2 mm plug extending a small distance out from the entrance to the capillary. During drying, electrical contact was made to the Nafion by inserting a wire, preferably stainless and more preferably platinum, palladium, or gold, into the capillary.

Fluid flowed from flow channel 110 into flight tube 140 (3 µm deep, 50 µm wide and about 3 mm long). Sensor 150, comprising two opposing electrodes, was positioned at the exit end of the flight tube. After exiting the flight tube, fluid flowed into outlet tube E.

Figure 4:
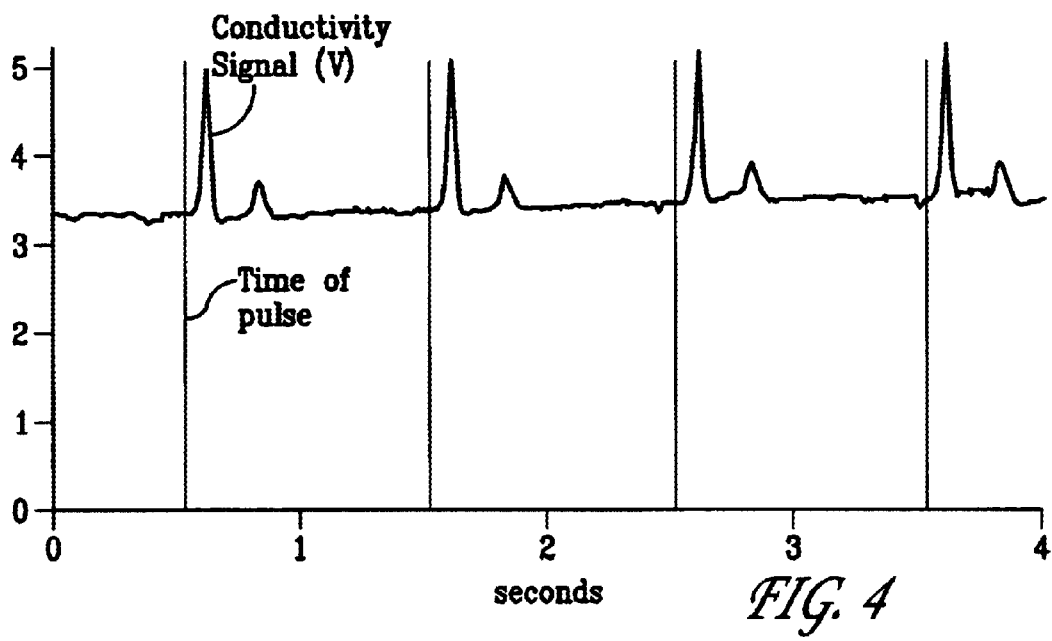
FIG. 4 shows the response of the mass flow sensor to a pulse train.

The ability of the time-of-flight flow sensor to measure fluid flow times reproducibly is illustrated in FIG. 4. A syringe pump was used to pump a solution of water and 0.1% trifluoroacetic acid (TFA) through the microfluidic device illustrated by FIG. 3 at flow rates ranging from 3.3 nL/min to 830 nL/min. As shown in FIG. 4, two sharp peaks in solution conductivity were observed subsequent to applying a voltage pulse to the Nafion electrodes. In order to demonstrate the reproducibility of the method for measuring fluid flow rate, a series of voltage pulses was applied to the electrodes for a fluid flow rate of about 166 nL/min. As can be seen by reference to FIG. 4, the series of conductivity responses were substantially identical.

Figure 5:
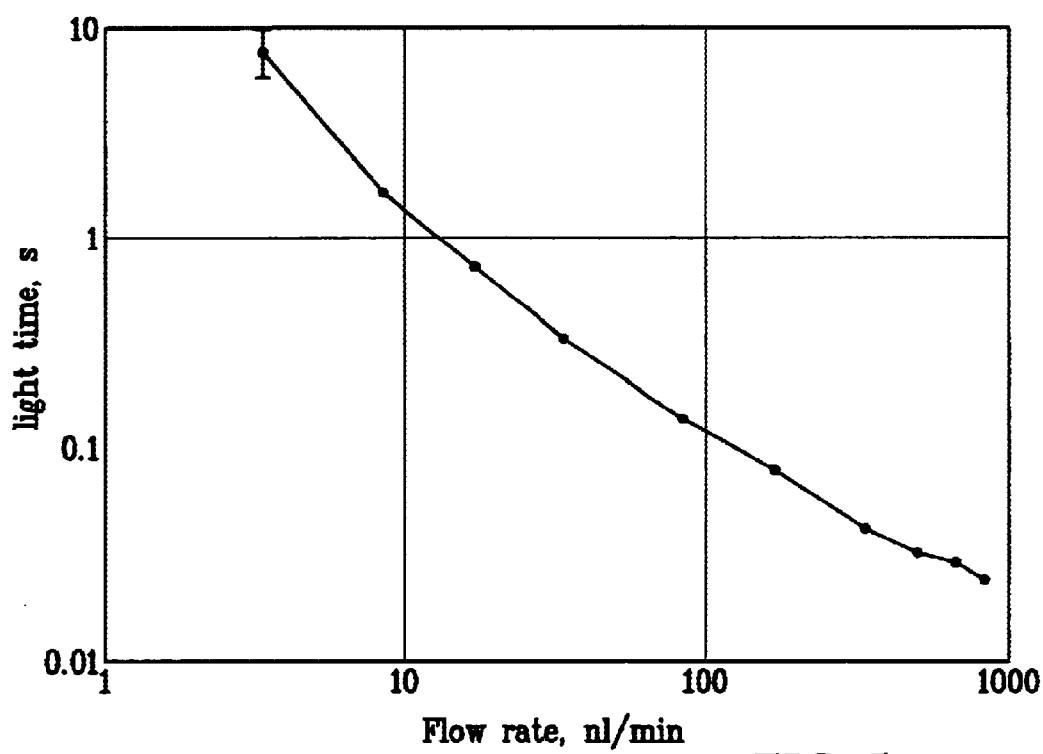
FIG. 5 is a plot of the reciprocal of the time-of-flight vs. flow rate.

The time-of-flight, i.e., the elapsed time between application of a voltage pulse and detection of the resulting change in conductivity of a fluid, for a series of fluid flow rates ranging from 3.3 nL/min to 830 nL/min was measured. For purposes of these measurements the time-of-flight was measured from application of the voltage pulse to the centerline of the first conductivity peak. The results of these measurements are shown in FIG. 5 where the logarithm of the reciprocal of the flight time (1/sec) is plotted vs. flow rate. The standard deviation for each data point, except the first, is less than 5% (based on at least 30 measurements).

In summary, the present invention relates to a device that can operate at pressures as great as 10,000 psi for measuring fluid flow rates generally, and particularly in microchannels, over a wide range of flow rates (<1 nL/min to >10 µL/min),. Electrochemical means are used to produce localized compositional variations in a flowing fluid at two distinct locations along the flow axis. The compositional variation, or pulse, that is subsequently detected downstream from its point of creation is used to derive a flow rate.

We claim:

1. A device for measuring the flow rate of a liquid in a flow channel, comprising:

a pair of spaced-apart electrodes disposed along the liquid flow axis in the flow channel;

means for applying a voltage pulse to said pair of electrodes to produce a variation in the composition of the liquid;

means for detecting the compositional variation; and means for measuring flight time.

2. The device of claim 1, wherein the compositional variation includes changes in pH.

3. The device of claim 1, further including a flight tube attached to the exit of the flow channel and concentric with the flow channel.

4. The device of claim 1, wherein said means for detecting is a conductivity sensor.

5. The device of claim 1, wherein the electrodes include stainless steel, platinum, palladium, or gold.

6. The device of claim 1, wherein the electrodes comprise an outer body fabricated from a microporous material and an inner metal electrode.

7. The device of claim 6, wherein the microporous material is a porous glass or an ionomer material.

8. The device of claim 7, wherein the ionomer material is a cation-selective perfluorosulfonate ionomer.

9. A device for measuring liquid flow rates, comprising:

a substrate fabricated to define a microchannel system disposed thereon, the microchannel system, in part, comprising:

a flow channel;

a pair of spaced-apart electrodes disposed along the liquid flow axis in the flow channel;

means for applying a voltage pulse to said pair of electrodes to produce a variation in the composition of the liquid;

means for detecting the compositional variation; and means for measuring flight time.

10. The device of claim 9, wherein the electrodes comprise an outer body fabricated from a microporous material and an inner metal electrode.

11. The device of claim 10, wherein the ion selective material is a porous glass or an ionomer material.

12. The device of claim 11, wherein the ionomer material is a cation-selective perfluorosulfonate ionomer.

13. A device for measuring liquid flow rates at pressures as great as 10,000 psi, comprising:

a flow channel;

a pair of spaced-apart electrodes disposed along the liquid flow axis in the flow channel;

means for applying a voltage pulse to said pair of electrodes to produce a variation in the composition of the liquid;

means for detecting the compositional variation; and means for measuring flight time.

14. A method for measuring liquid flow rates, comprising:

providing a liquid flow channel;

flowing liquid through the flow channel;

producing a compositional variation in the liquid;

detecting the compositional variation; and measuring the flight time of the variation.

15. An electrode for electrokinetic systems, comprising;

an outer body fabricated from a microporous material and an inner metal electrode.

16. The electrode of claim 15, wherein the microporous material is a porous glass or an ionomer material.

17. The device of claim 16, wherein the ion selective material is a cation-selective persulfonate ionomer.

* * * * *